United States Patent
Kisakibaru et al.

(10) Patent No.: US 11,480,352 B2
(45) Date of Patent: Oct. 25, 2022

(54) DEVICE FOR MEASURING CLOGGING OF FILTER IN AIR CONDITIONER AND AIR CONDITIONER

(71) Applicant: Cambridge Filter Corporation, Tokyo (JP)

(72) Inventors: Toshiro Kisakibaru, Tokyo (JP); Isao Honbori, Tokyo (JP); Akira Yamazaki, Tokyo (JP)

(73) Assignee: Cambridge Filter Corporation, Tokyo (JP)

( * ) Notice: Subject to any disclaimer, the term of this patent is extended or adjusted under 35 U.S.C. 154(b) by 379 days.

(21) Appl. No.: 16/628,215

(22) PCT Filed: Jul. 5, 2018

(86) PCT No.: PCT/JP2018/025604
§ 371 (c)(1),
(2) Date: Jan. 2, 2020

(87) PCT Pub. No.: WO2019/009379
PCT Pub. Date: Jan. 10, 2019

(65) Prior Publication Data
US 2020/0149766 A1    May 14, 2020

(30) Foreign Application Priority Data
Jul. 6, 2017 (JP) .............................. JP2017-132540

(51) Int. Cl.
*F24F 11/39* (2018.01)
*F24F 11/00* (2018.01)
*F24F 11/63* (2018.01)

(52) U.S. Cl.
CPC .......... *F24F 11/39* (2018.01); *F24F 11/0001* (2013.01); *F24F 11/63* (2018.01)

(58) Field of Classification Search
CPC ........ F24F 11/0001; F24F 11/39; F24F 11/63; F24F 3/052; F24F 7/00; F24F 8/00; F24F 13/00
See application file for complete search history.

(56) References Cited

U.S. PATENT DOCUMENTS 10,363,509 B2 *  7/2019  Arthur .................... B01D 46/10
10,646,809 B2 *  5/2020  Arthur ..................... F24F 11/39
(Continued)

FOREIGN PATENT DOCUMENTS

DE    102010048208 A1    4/2012
EP        0580038 A2     1/1994
(Continued)

OTHER PUBLICATIONS

Japanese Patent Office, International Search Report for PCT Application No. PCT/JP2018/025604 dated Oct. 2, 2018, 1 page.
(Continued)

*Primary Examiner* — Sisay Yacob
(74) *Attorney, Agent, or Firm* — Sunstein LLP

(57) ABSTRACT

A device that can accurately detect clogging of a filter and that has a simple structure is provided. A device for measuring clogging of a filter in an air conditioner (2) having a blower (30) that blows gas (40), (42) through a duct (10) and a filter (20) that is provided in the duct (10) and filters dust floating in the gas, comprises a device (26) for measuring a sound pressure that is provided in the duct (10), a data processor (70) that extracts data on the sound pressure at a specific frequency from the data on the sound pressure that have been measured by means of the device (26) for measuring a sound pressure, and an estimating device (70) that estimates clogging of the filter based on the data on the sound pressure at the specific frequency that have been extracted by means of the data processor (70).

9 Claims, 11 Drawing Sheets

(56) References Cited

U.S. PATENT DOCUMENTS

2019/0262756 A1\* 8/2019 Arthur .................... H04W 4/80
2019/0291037 A1\* 9/2019 Arthur ................. B01D 46/521

FOREIGN PATENT DOCUMENTS

| JP | 4-9537 | 1/1992 |
| JP | 10-66815 | 3/1998 |
| JP | 2013-160449 | 8/2013 |
| JP | 2016-70505 | 5/2016 |

OTHER PUBLICATIONS

European Patent Office; Extended European Search Report for EPO Application No. 18827368.4; dated Feb. 10, 2021; 17 pages.

\* cited by examiner

DEVICE FOR MEASURING CLOGGING OF FILTER IN AIR CONDITIONER AND AIR CONDITIONER

CROSS-REFERENCE TO RELATED APPLICATIONS

This application is the national phase entry of international patent application No. PCT/JP2018/025604 filed Jul. 5, 2018 and claims the benefit of Japanese patent application No. 2017-132540, filed Jul. 6, 2017, the disclosures of which are incorporated herein by reference in their entirety.

TECHNICAL FIELD

The present invention relates to a device for measuring clogging of a filter in an air conditioner and to an air conditioner. Specifically, it relates to a device that accurately measures clogging of a filter and that has a simple structure and relates to an air conditioner that has that device.

BACKGROUND ART

Equipment for cleaning air positioned along a curved path in an air conditioner is mainly composed of a blower that takes in and transports air and a filter that removes dust from the air. In the air conditioner, when the filter is clogged by dust so that a loss of the pressure increases, the required volume of air cannot be supplied. Thus, the filter must be periodically cleaned or replaced. The loss of the pressure is measured by using a differential pressure gauge that measures the pressure differential between the pressure at the upstream side and the pressure at the downstream side of the filter. However, since the loss of the pressure varies depending on the flow of the air to be transported, the loss of the pressure must be measured by adjusting the airflow to a standard airflow by means of a flow controller that adjusts the airflow and by means of a flowmeter that measures the airflow. Alternatively, the loss of the pressure that has been measured must be corrected based on the airflow that is measured. Since such a unit for detecting a loss of a pressure requires many devices, is expensive, and needs complicated maintenance, it would be utilized for only a large air conditioner. Thus, there is a request for a technology that can simply and directly measure clogging of a filter.

By the invention that is disclosed in Patent Literature 1, a reflective board for infrared rays is provided within an air filter. Infrared rays are irradiated from an infrared source that is located at the upstream side of the air filter. A sensor that senses infrared rays that have been reflected by the reflective board analyzes the shape of the reflected pattern, so as to measure the clogging of the air filter. By this invention, an infrared source must be provided to an air conditioner and a reflective board on which a pattern is formed must also be provided within the air filter. Thus, the device is complicated.

By the invention that is disclosed in Patent Literature 2, sections for receiving light that are provided upstream and downstream of an air filter receive ambient light. Clogging of the filter is measured based on the difference between the intensities of the received light. By this invention, since the result can be affected by the amount of the ambient light, the positions to measure clogging are limited.

Therefore, the present invention aims to provide a device to accurately measure clogging of a filter. The device has a simple structure.

PRIOR-ART PUBLICATIONS

Patent Literature

Patent Literature 1:
 Japanese Patent Laid-open Publication No. 2013-160449
Patent Literature 2:
 Japanese Patent Laid-open Publication No. 2016-70505

DISCLOSURE OF INVENTION

A device for measuring clogging of a filter in an air conditioner of a first aspect of the present invention, for example, as in FIG. 2, in an air conditioner 2 that comprises a blower 30 that blows gas 40, 42 through a duct 10 and a filter 20 that is provided in the duct 10 and filters dust floating in the gas, comprises a device 26 for measuring a sound pressure that is provided in the duct 10. It also comprises a data processor 70 that extracts data on the sound pressure at a specific frequency from the data on the sound pressure that have been measured by means of the device 26 for measuring a sound pressure. It also comprises an estimating device 70 that estimates clogging of the filter based on the data on the sound pressure at the specific frequency that have been extracted by means of the data processor 70.

By this configuration, since the data on the sound pressure are measured by the device for measuring a sound pressure that is provided in the duct to extract a sound pressure at a specific frequency and clogging of the filter is estimated based on changes in the data on the sound pressure that have been extracted, a device for measuring clogging of a filter in an air conditioner that has a simple structure can be provided. Further, since only the data on the sound pressure at the specific frequency are used, any sound pressure caused by noise can be removed, so that the measurement is reliable.

By the device for measuring clogging of the filter in the air conditioner of a second aspect of the present invention, in the device of the first aspect, for example, as in FIG. 2, the device 26 for measuring a sound pressure is located nearer the blower 30 than the filter 20 is, in the duct 10. By this configuration, since the device for measuring a sound pressure is located nearer the blower than the filter is, the device for measuring a sound pressure can measure clogging of the filter based on the sound pressure at a specific frequency that has been generated by the blower and that has been reflected by the filter.

By the device for measuring clogging of the filter in the air conditioner of a third aspect of the present invention, in the device of the first aspect, for example, as in FIG. 4, the device 26 for measuring a sound pressure is located on one side of the filter 20 and the other side of the filter 20 faces the blower 30, in the duct 10. By this configuration, since the device for measuring a sound pressure is located at one side and the other side faces the filter, the device for measuring a sound pressure measures clogging of the filter based on a sound pressure at a specific frequency that has been generated by the blower and has passed through the filter.

By the device for measuring clogging of the filter in the air conditioner of a fourth aspect of the present invention, in the device of any of the first to third aspects, the specific frequency is the natural frequency of the blower 30. By this configuration, since the specific frequency is the natural frequency of the blower, clogging of the filter can be measured based on a sound pressure that has been reflected by, or has passed through, the filter, by using the sound pressure that has been generated by the blower that has the natural frequency.

By the device for measuring clogging of the filter in the air conditioner of a fifth aspect of the present invention, in the device of any of the first to third aspects, for example, as in FIG. 6, a buzzer 28 that generates a sound pressure at the natural frequency is provided in the duct 10 and the specific frequency is the natural frequency of the buzzer 28. By this configuration, since a buzzer is provided in the duct and the specific frequency is the natural frequency of the buzzer, clogging of the filter can be measured based on a sound pressure that has been reflected by, or has passed through, the filter, by using the sound pressure that has been generated by the buzzer.

By the device for measuring clogging of the filter in the air conditioner of a sixth aspect of the present invention, in the device of any of the first to third aspects, for example, as in FIG. 10, an oscillator 60 and a speaker 62 that generate a sound at a frequency that is determined based on the filter 20 are provided in the duct 10, wherein the specific frequency is a frequency of the sound that is generated by the oscillator 60 and the speaker 62. By this configuration, clogging of the filter can be measured based on the sound pressure that has been reflected by, or has passed through, the filter, by using a sound pressure generated at a specific frequency that is determined based on the filter.

By the device for measuring clogging of the filter in the air conditioner of a seventh aspect of the present invention, in the device of any of the first to sixth aspects, the estimating device 70 estimates clogging of the filter by using the data on the sound pressure at the specific frequency that change with clogging of the filter 20. By this configuration, since clogging of the filter is estimated by using the data on the sound pressure at the specific frequency that change with clogging of the filter, the clogging of the filter is accurately measured without being affected by a sound pressure caused by noise.

An air conditioner of an eighth aspect of the present invention, for example, as in FIG. 2, comprises the device for measuring clogging of the filter in the air conditioner of any of the first to seventh aspects, the duct 10, the blower 30, and the filter 20. By this configuration, the air conditioner has a device for measuring clogging of a filter that accurately measures clogging of the filter. The device has a simple structure.

By the device for measuring clogging of a filter in an air conditioner of the present invention, in the air conditioner that comprises a blower that blows gas through a duct and a filter that is provided in the duct and filters dust floating in the gas, since the device comprises a device for measuring a sound pressure that is provided in the duct, a data processor that extracts data on the sound pressure at a specific frequency from data on the sound pressure that have been measured by means of the device for measuring a sound pressure, and an estimating device that estimates clogging of the filter based on the data on the sound pressure at the specific frequency that have been extracted by means of the data processor, wherein the data on the sound pressure are measured by means of the device for measuring a sound pressure that is provided in the duct, and wherein clogging of the filter is estimated based on the data on the sound pressure at the specific frequency, the clogging of the filter can be accurately measured. The device for measuring clogging of a filter in an air conditioner has a simple structure.

Since the air conditioner of the present invention comprises the above-mentioned device for measuring clogging of a filter in an air conditioner, the duct, the blower, and the filter, the air conditioner has a device for accurately measuring clogging of the filter, which device has a simple structure.

The basic Japanese patent application, No. 2017-132540, filed Jul. 6, 2017, is hereby incorporated by reference in its entirety in the present application.

The present invention will become more fully understood from the detailed description given below. However, that description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, under the doctrine of equivalents, a part of the present invention.

The use of the articles "a," "an," and "the" and similar referents in the specification and claims are to be construed to cover both the singular and the plural form of a noun, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

MODE FOR CARRYING OUT THE INVENTION

Figure 1:
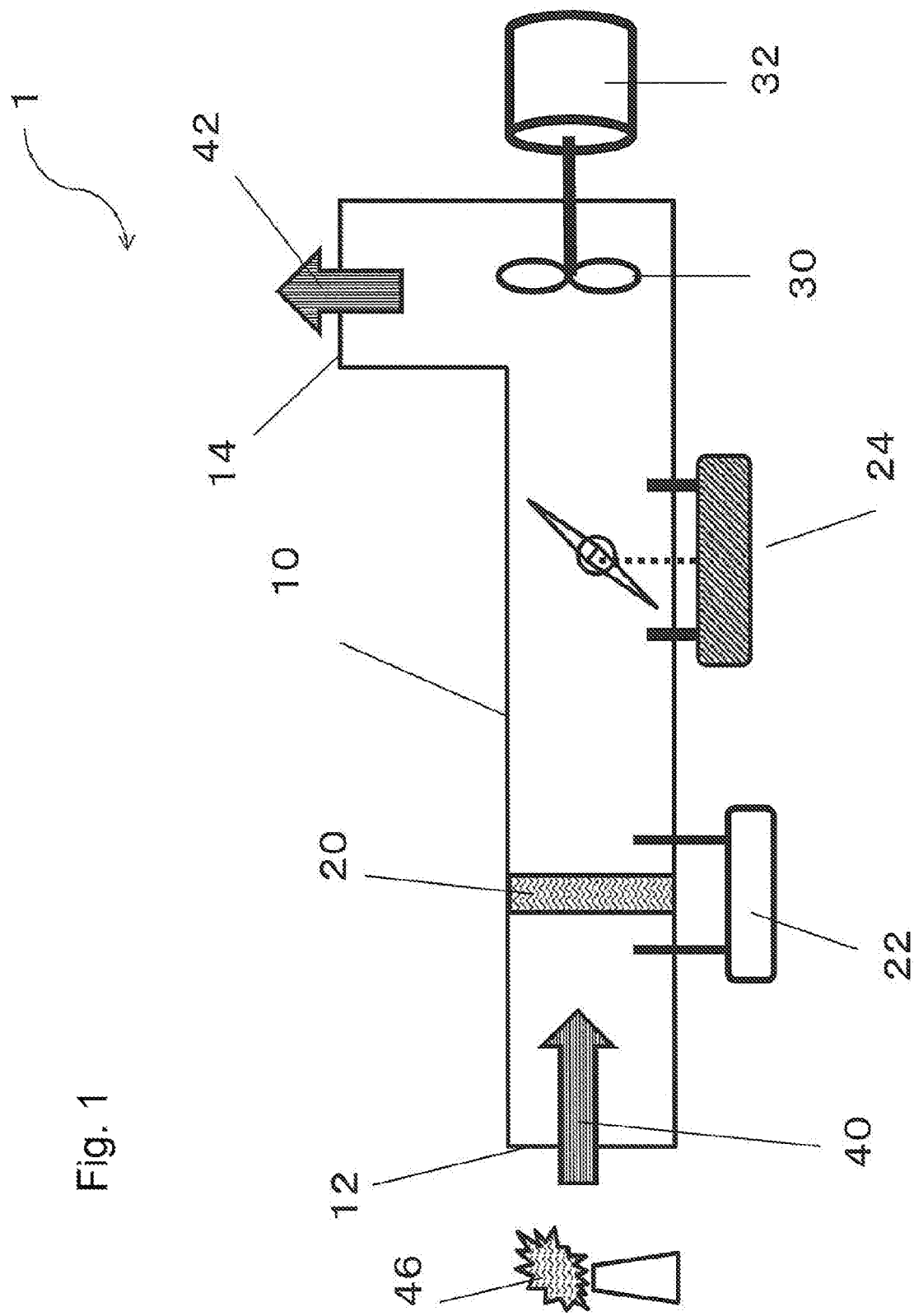
FIG. 1 is a schematic drawing of a horizontal-type device for testing a filter that is used for evaluating the effects of the present invention.

Below, with reference to the drawings, some embodiments of the present invention are discussed. In the drawings, the same or corresponding elements are denoted by the same reference numbers so that duplicate explanations are omitted. FIG. 1 is a schematic drawing of a horizontal-type device 1 for testing a filter that replicates a typical air conditioner. Here, the horizontal-type device 1 for testing a filter is also called the air conditioner 1. The other horizontal-type devices 2, 3, 4, 5, 6, and 7 for testing a filter may be called the air conditioners 2, 3, 4, 5, 6, and 7, respectively.

The horizontal-type device 1 for testing a filter comprises a duct 10 that forms a flow path of the gas that is transported. It also comprises a blower 30 that blows the gas through the duct. It also comprises a filter 20 that filters dust floating in the gas. The duct 10 is not necessarily limited to any specific type, and so a duct that has a rectangular cross-section may be used. The duct 10 is horizontal and extends from an intake port 12. The blower 30 is located at the side facing the intake port 12. The duct 10 bends at a right angle at the side near the blower 30 and has an exhaust port 14 beyond the end of the bend. Incidentally, the shape of the duct 10 is not limited to the above-mentioned one.

In the horizontal-type device 1 for testing a filter, an intake blower is used for the blower 30. When activating the blower 30, the gas 40 that has been taken through the intake port 12 is suctioned into the duct 10 by passing through the filter 20. The gas 42 that has passed through the filter 20 curves at the blower 30 along the duct 10 to be exhausted through the exhaust port 42. The blower 30 is driven by a driver 32, such as a motor, which is located outside the duct 10. The blower 30 may be located upstream of the filter 20 and may be an exhaust blower.

The filter 20 is not limited to any specific type, but may be a HEPA (High Efficiency Particulate Air) filter, an ULPA (Ultra Low Penetration Air) filter, or a medium-performance filter. In the horizontal-type device 1 for testing a filter a HEPA filter was used.

An instrument 22 for measuring the pressure at the filter is provided across the filter 20 so that it measures the loss of the pressure of the filter 20 based on the difference in pressures upstream of and downstream of the filter 20. The difference in the pressures may be measured by using two pressure gauges, one upstream and one downstream, of the filter 20.

A flow controller 24 is provided downstream of the filter 20. The flow controller 24 is a device like a damper for controlling the airflow. It narrows the flow path in the duct 10 to adjust the airflow in it. In FIG. 1, it is shown to have one blade. However, it may have multiple blades. The flow controller 24 also measures the flow of the gas to be transported in the duct 10. Incidentally, the flow of the gas may be measured by a flowmeter that is provided in addition to the flow controller.

In the horizontal-type device 1 for testing a filter a dust-generator 46 is provided near the intake port 12. The dust-generator 46 causes the dust to float in the gas that is to be filtered by the filter 20. The type of the dust is not limited. In the horizontal-type device 1 for testing a filter camphor is burned so that the smoke is sucked in by the intake port 12 to be filtered by the filter 20. In other words, particles of the smoke of the camphor accumulate in the filter 20 to cause the filter 20 to clog.

Figure 2:
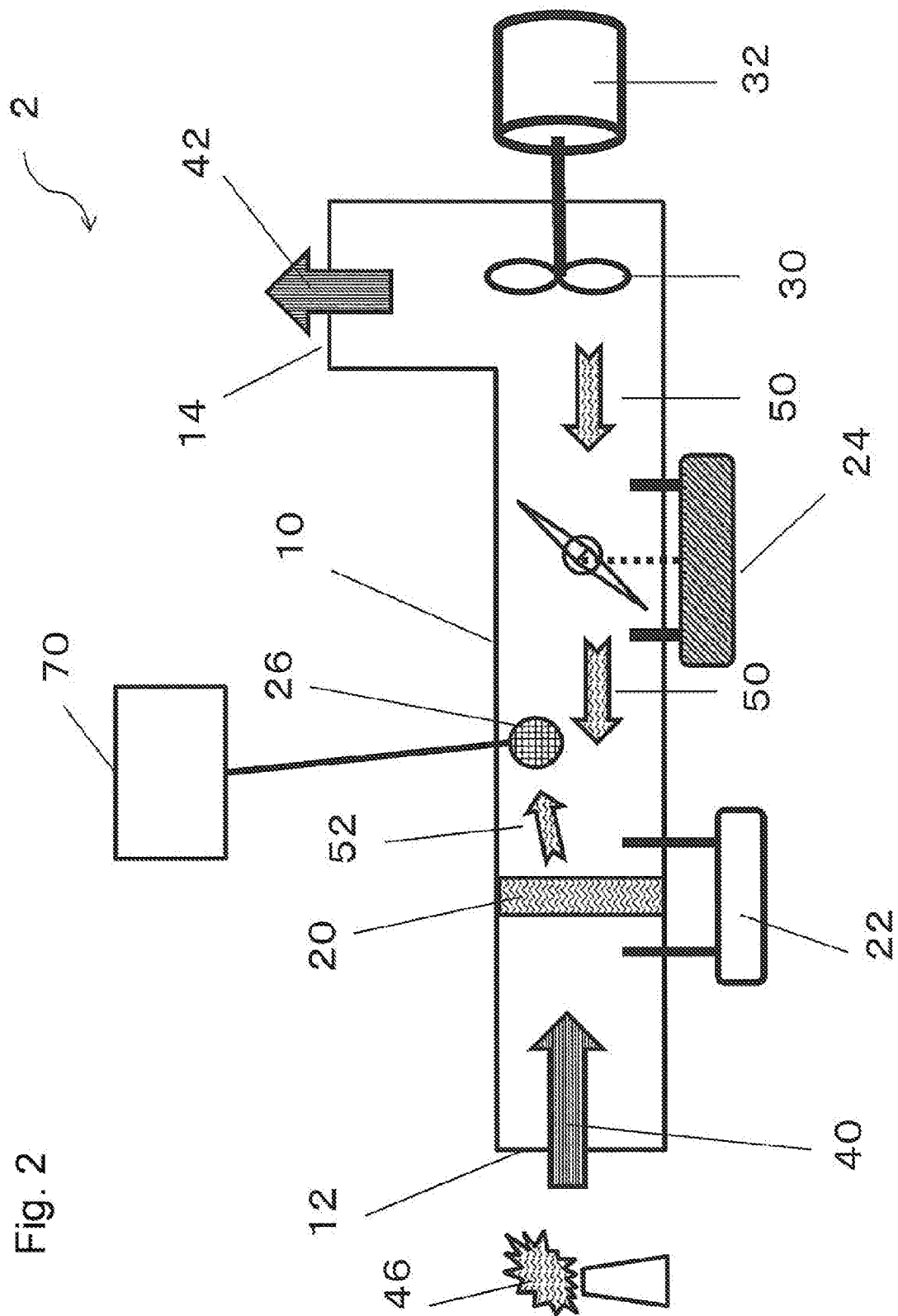
FIG. 2 is a schematic drawing of a horizontal-type device for testing a filter that measures a sound pressure generated by blades of a blower that has been reflected by the filter.

FIG. 2 is a schematic drawing of the horizontal-type device 2 for testing a filter. It is the horizontal-type device 1 for testing a filter as in FIG. 1 in which a microphone 26 for detecting the sound pressure is provided. In the horizontal-type device 2 for testing a filter the microphone 26 for detecting the sound pressure, which is a device for measuring a sound pressure, is located downstream of the filter 20. The type of the microphone 26 for detecting the sound pressure is not limited, and may be a commercial microphone.

The horizontal-type device 2 for testing a filter has a controller 70. The controller 70 functions as a data processor that extracts the data on the sound pressure at the specific frequency from the data on the sound pressure that are measured by means of the microphone 26 for detecting the sound pressure. For the data processing, the measured data on the sound pressure are subject to a Fourier transform to be transformed into frequency-domain data. Only the data at a specific frequency are extracted. The extracted data are subject to an inverse Fourier transform to obtain time-domain data on the sound pressure. In this way the data on the sound pressure at the specific frequency can be extracted. The controller 70 also functions as an estimating device to estimate clogging of the filter 20, i.e., a degree of clogging of it or a need for replacing the filter 20, based on the data on the sound pressure at the specific frequency that have been extracted. Incidentally, the data processor that extracts the data on the sound pressure at the specific frequency from the measured data on the sound pressure and the estimating device that estimates the clogging of the filter 20 based on the extracted data on the sound pressure at the specific frequency may be independent devices. Alternatively, they may be incorporated into a single device, such as the controller 70. The controller 70 may be modified to have both functions, in addition to a function to control the operation of the air conditioner. Alternatively, the controller 70 may be a personal computer sold on the market. In this way, the microphone 26 for detecting the sound pressure as the device for measuring a sound pressure, the controller 70 as the data processor that extracts the data on the sound pressure at the specific frequency from the measured data on the sound pressure, and the controller 70 as the estimating device that estimates clogging of the filter 20 based on the extracted data on the sound pressure at the specific frequency, each constitutes a device for measuring clogging of a filter in an air conditioner.

First, the horizontal-type device 2 for testing a filter is activated. The blower 30 rotates to generate a sound pressure 50. To measure the sound pressure when no dust accumulates in the filter 20, the sound pressure at the initial stage of the operation is measured. The data on the sound pressure that are measured by means of the microphone 26 for detecting the sound pressure are transmitted to the controller 70 so that the data at a specific frequency are extracted. Preferably the specific frequency is the natural frequency of the blower 30, since it is inherent to the machine. Assuming that the number of revolutions of the blower 30 is 3,600 rpm and the blower 30 has ten blades, the natural frequency is 600 Hz. Thus, for example, data at 600 Hz∓50 Hz are extracted. That is, the data on the sound pressure at the specific frequency can be the data on the sound pressure at frequencies having a range over and under the specific frequency. The extracted data are subject to an inverse Fourier transform to obtain the time-domain data on the sound pressure. In this way, by extracting the data on the sound pressure at the specific frequency the sound pressure caused by noise can be removed and the reliability of the data on the sound pressure is enhanced. Further, since they are extracted at the natural frequency of the blower 30, the data on the sound pressure that are generated at the sound source, i.e., the blower 30, are relatively uniform, and so less variations of the sound source affect the data. Further, no device for the sound source is required.

Incidentally, a method to extract the data at the specific frequency from the data on the sound pressure is not limited to the Fourier transform or the inverse Fourier transform, which are discussed above, but may be extracted by filtering the electric signals of the data on the sound pressure, i.e., using a low-pass filter and a high-pass filter.

The horizontal-type device 2 for testing a filter continues to operate. Then the dust that has been generated by the dust-generator 46 and that floats is suctioned through the intake port 12 to be filtered by the filter 20. Namely, the dust accumulates in the filter 20 over time, to cause clogging. Together with the clogging of the filter 20, the loss of the pressure of the filter 20 increases to decrease the flow of the gas that is transported through the duct 10. The flow may be adjusted by the flow controller 24 to be constant. In this case a damper for controlling airflow is adjusted to cause the flow that is measured by the flow controller 24 to be constant. During the operation of the horizontal-type device 2 for testing a filter, the microphone 26 for detecting the sound pressure measures the sound pressure. The instrument 22 for measuring the pressure at the filter measures the loss of the pressure of the filter 20.

Figure 3:
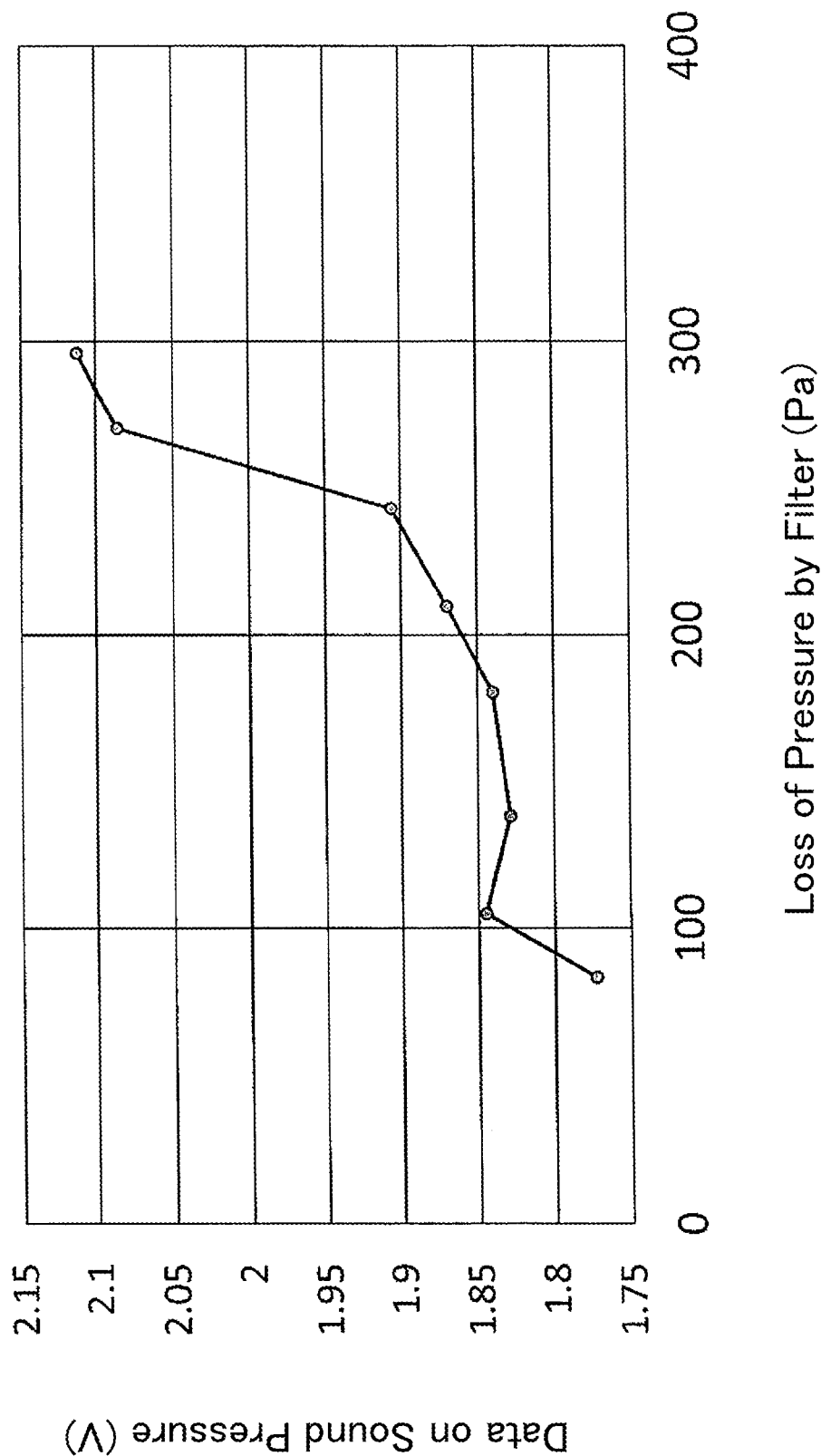
FIG. 3 is a graph showing the relationship between the loss of the pressure by the filter and a peak value of the data on the sound pressure at the specific frequency, which relationship is a result of testing by the device for testing a filter as in FIG. 2.

FIG. 3 is a graph showing the relationship between the loss of the pressure and the peak values of the data on the sound pressure. The abscissa indicates the loss of the pressure of the filter 20, which has been measured by the instrument 22 for measuring the pressure at the filter and by the flow controller (an instrument for measuring the flow) 24. The ordinate indicates the peak values of the data on the sound pressure at the specific frequency, which are extracted by applying the Fourier transform and the inverse Fourier transform to the data on the sound pressure, which have been measured by the microphone 26 for detecting the sound pressure. It can be seen in FIG. 3 that when the loss of the pressure increases the peak value also increases.

The increase of the loss of the pressure reflects the increase of clogging of the filter 20. When the clogging increases, the peak value increases. This would be because the sound pressure 50 that has been generated by the blower 30 and transmitted through the duct 10 is better reflected by the filter 20 if the clogging of the filter 20 increases. When the clogging of the filter 20 is not significant, the sound pressure that is transmitted by the filter 20 is great and the sound pressure 52 that is reflected by it is little. However, when the clogging increases, the portion 52 that is reflected increases, so that the sound pressure that is measured by the microphone 26 for detecting the sound pressure increases. That is, by measuring the sound pressure the clogging of the filter 20 can be estimated.

Figure 4:
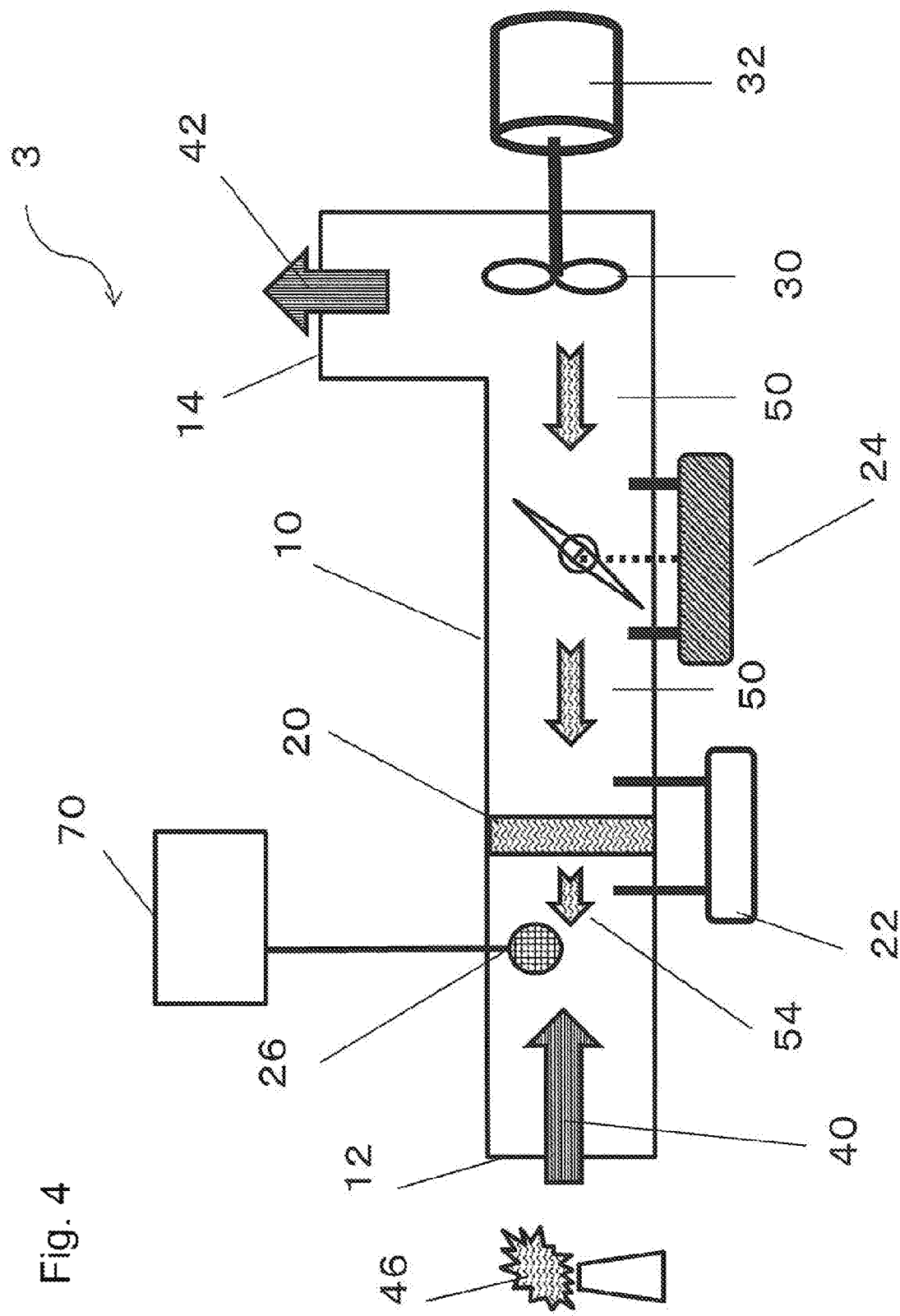
FIG. 4 is a schematic view of the horizontal-type device for testing a filter that measures the sound pressure generated by the blades of the blower that has been transmitted through the filter.

FIG. 4 is a schematic diagram of the horizontal-type device 3 for testing a filter. By it the microphone 26 for detecting the sound pressure is located upstream of the filter 20. The filter 20 is a medium-performance filter. The other elements are the same as those of the horizontal-type device 2 for testing a filter.

Figure 5:
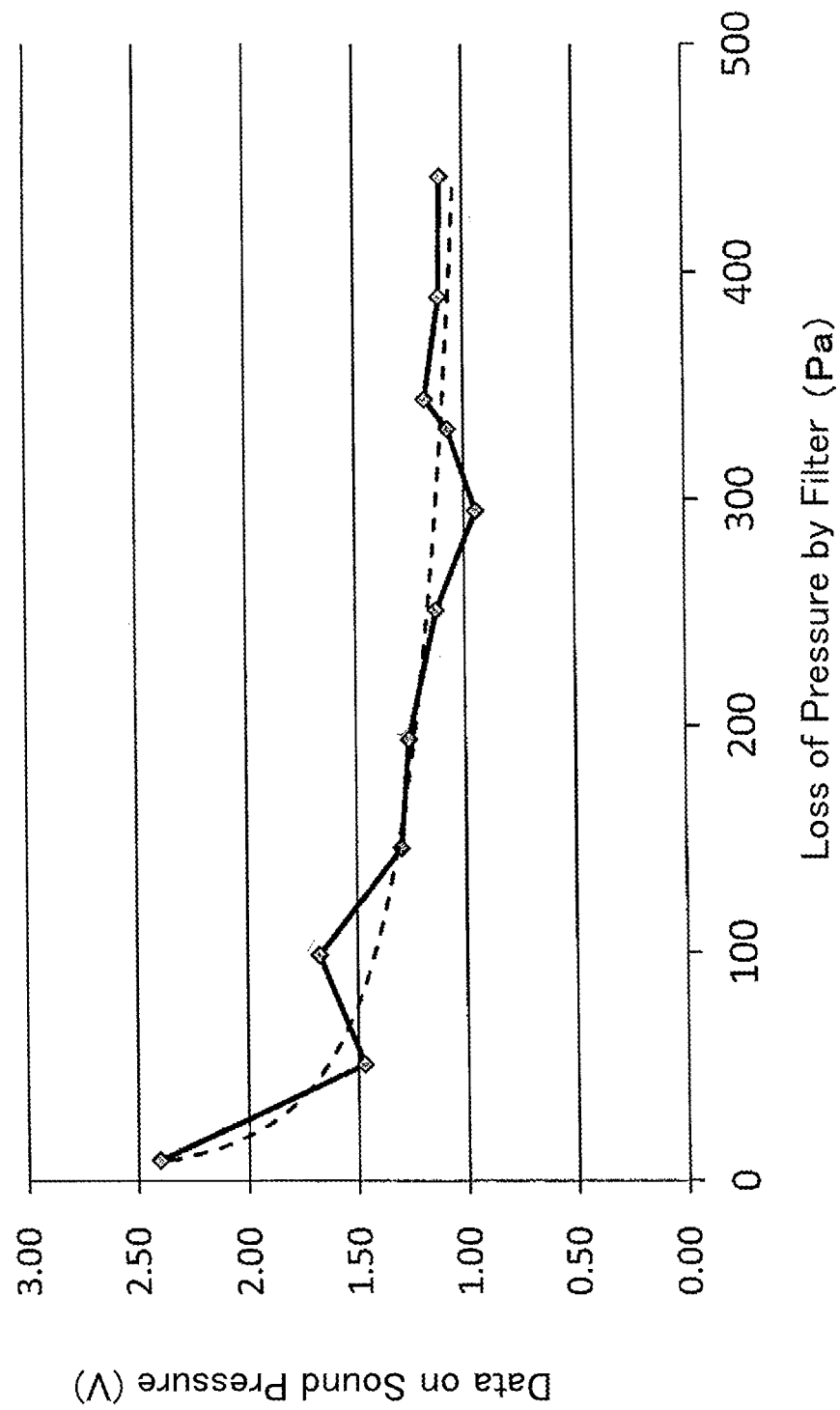
FIG. 5 is a graph showing the relationship between the loss of the pressure by the filter and a peak value of the data on the sound pressure at the specific frequency, which relationship is a result of testing by the device for testing a filter as in FIG. 4.

FIG. 5 shows the relationship between the loss of the pressure and the peak values of the data on the sound pressure that are measured by the horizontal-type device 3 for testing a filter. The dashed line is an approximated curve that is shown for reference. FIG. 5 shows that when the loss of the pressure increases the peak value decreases. This would be because the sound pressure 54 (see FIG. 4) that has passed through the filter 20 decreases if the clogging of the filter 20 increases. In this way, when the microphone 26 for detecting the sound pressure is located upstream of the filter 20, by measuring the sound pressure the clogging of the filter 20 can be estimated.

Figure 6:
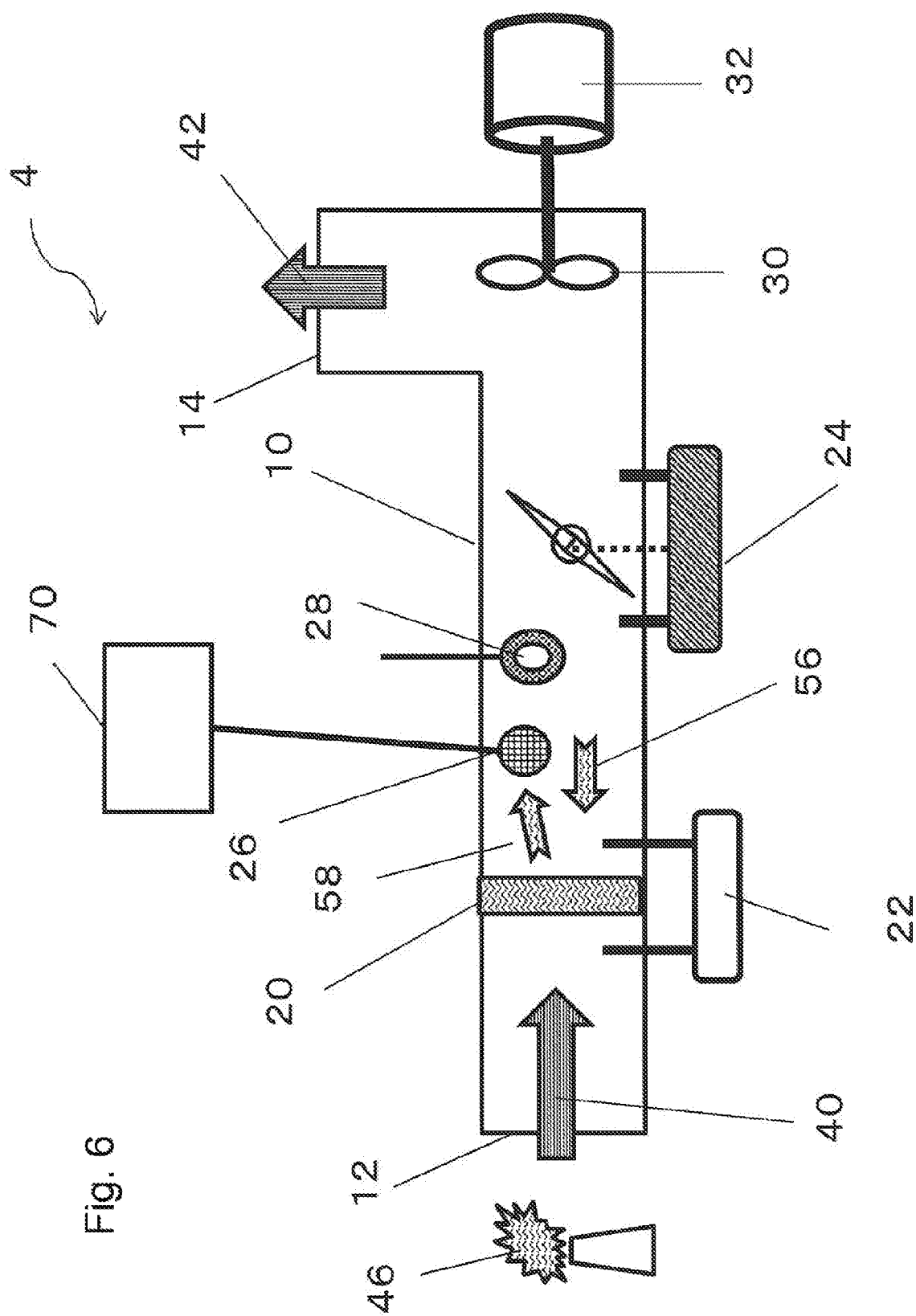
FIG. 6 is a schematic view of the horizontal-type device for testing a filter that measures the sound pressure of the buzzer that has been reflected by the filter.

FIG. 6 is a schematic view of the horizontal-type device 4 for testing a filter. In it the buzzer 28 is located downstream of the filter 20 and the microphone 26 for detecting the sound pressure. The other elements are the same as those of the horizontal-type device 2 for testing a filter.

Since the buzzer 28 generates a sound pressure at a specific frequency, it is suitable for a sound source for measuring clogging of a filter. The buzzer 28 is an electronic buzzer that uses a piezoelectric element in the horizontal-type device 4 for testing a filter, but is not limited to this. The sound pressure 56 that is generated by the buzzer 28 is reflected by the filter 20. Like the horizontal-type device 2 for testing a filter, when the clogging of the filter 20 increases, the reflected sound pressure 58 increases. Thus, by measuring the sound pressure the clogging of the filter 20 can be estimated. Incidentally, the buzzer 28, which generates a sound pressure at a specific frequency in the duct 10, is a part of a device for measuring clogging of a filter.

Figure 7:
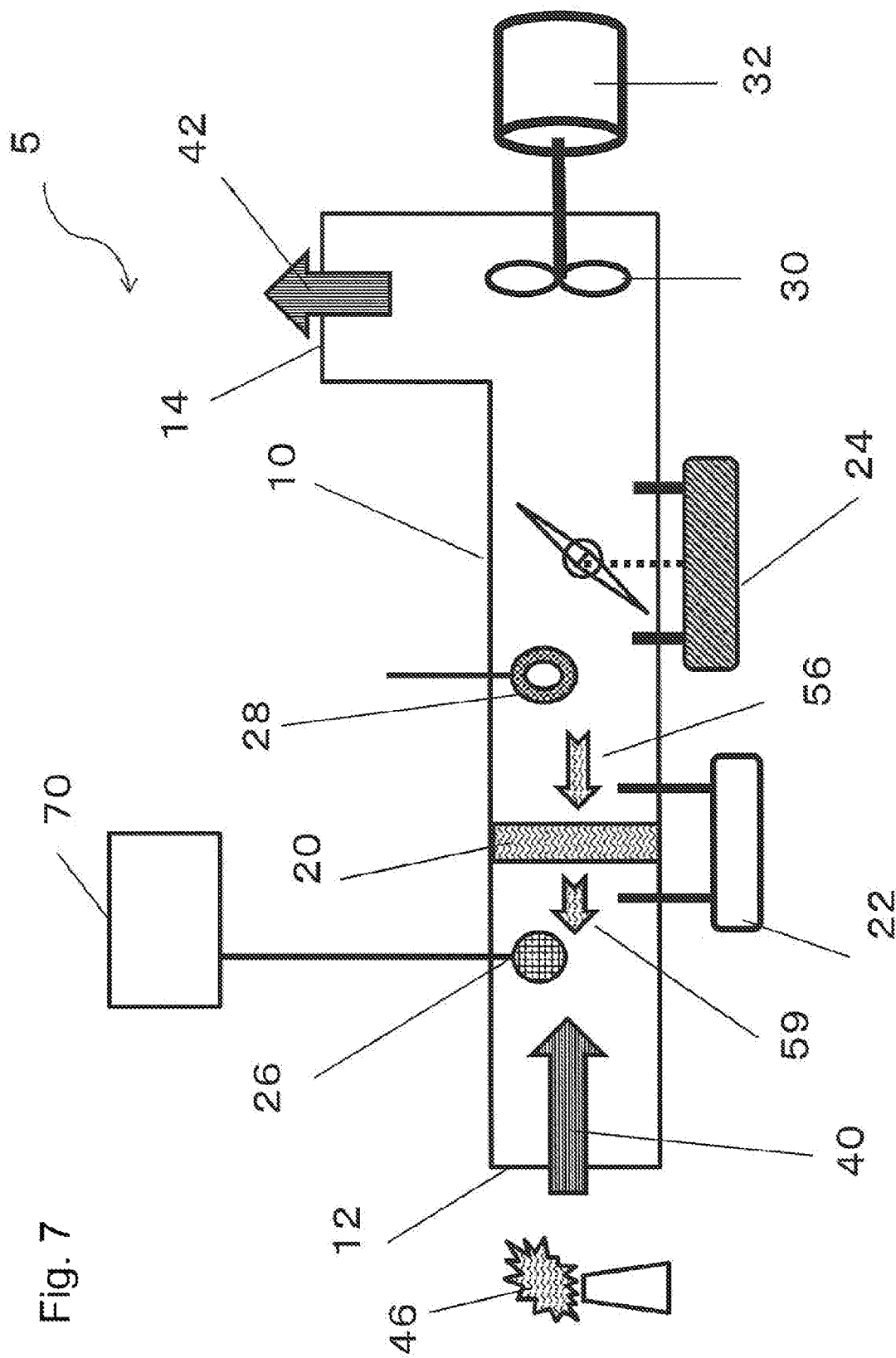
FIG. 7 is a schematic view of the horizontal-type device for testing a filter that measures the sound pressure of the buzzer that has been transmitted through the filter.

FIG. 7 is a schematic view of the horizontal-type device 5 for testing a filter. In it the microphone 26 for detecting the sound pressure is located upstream of the filter 20. The other elements are the same as those of the horizontal-type device 4 for testing a filter. Like the horizontal-type device 3 for testing a filter, when the clogging of the filter 20 increases, the sound pressure 59 that has passed through the filter 20 decreases. Thus, by measuring the sound pressure the clogging of the filter 20 can be estimated.

Figure 8:
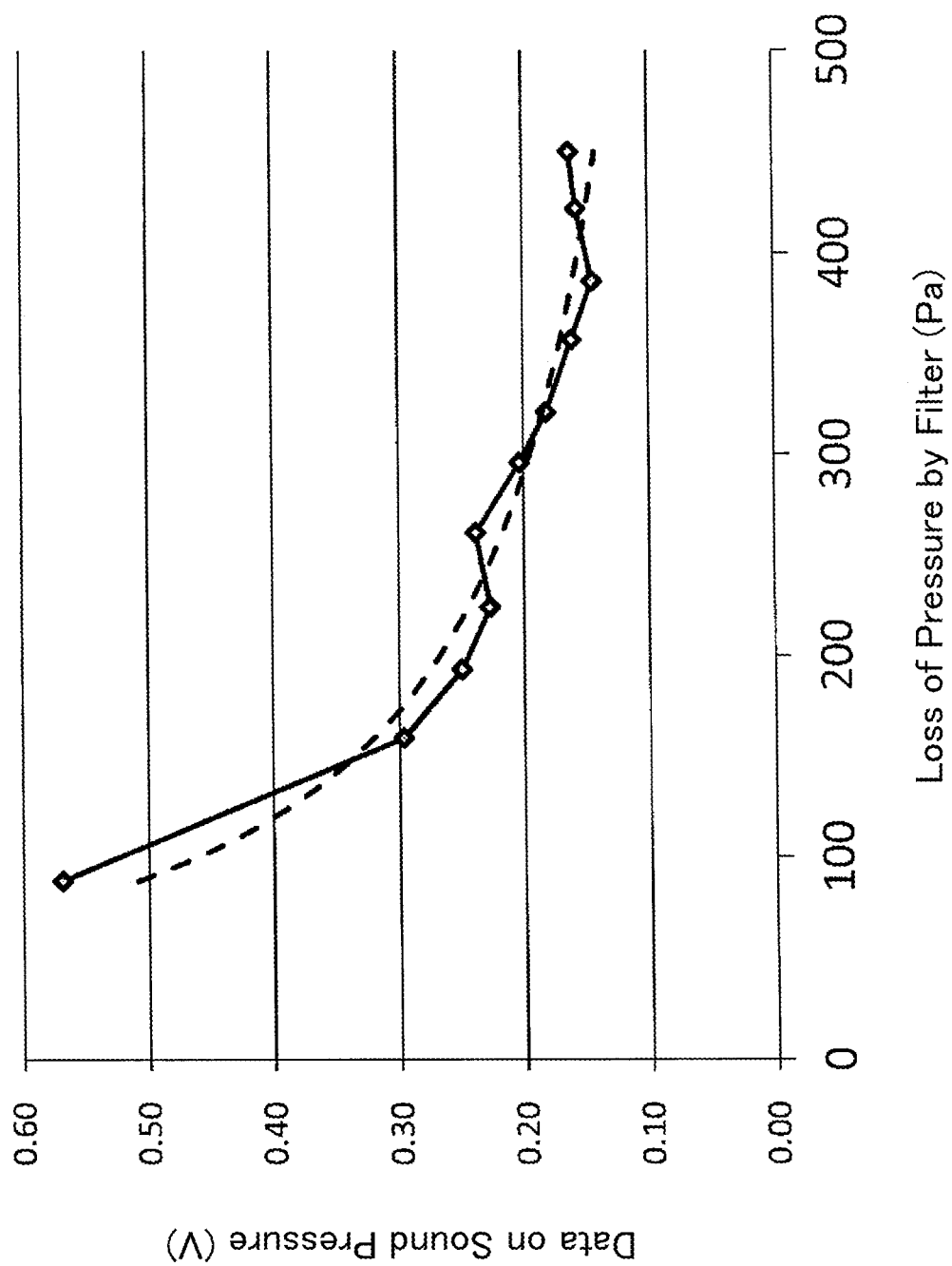
FIG. 8 is a graph showing the relationship between the loss of the pressure by the filter and a peak value of the data on the sound pressure at the specific frequency, which relationship is a result of testing by the device as in FIG. 7.

FIG. 8 shows the relationship between the loss of the pressure and the peak values of the data on the sound pressure that are measured by the horizontal-type device 5 for testing a filter. Incidentally, the dashed line is an approximated curve that is shown for reference. In the horizontal-type device 5 for testing a filter, an electronic buzzer at a frequency of 3 kHz is used for the buzzer 28. The controller 70 performs a Fourier transform on the data on the sound pressure that are measured by the microphone 26 for detecting the sound pressure. The controller 70 extracts data at a frequency of 3 kHz∓200 Hz from the result of the transform. Then it performs an inverse Fourier transform on the extracted data and obtains the peak values that result from the transform. When the loss of pressure of the filter 20 increases, the peak values notably decrease.

Incidentally, the buzzer 28 is used as the sound source if the blower 30 is not suitable as the sound source. For example, the blower 30, which has no constant natural frequency, is not suitable when the number of revolutions is changeable by means of an inverter, etc., to adjust the flow.

In the horizontal-type device 5 for testing a filter as in FIG. 7, various kinds of the filter 20 are used and the frequency of the sound pressure to be generated is varied, to investigate attenuation of the transmitted sound pressure. A medium-performance filter that has a filtering efficiency of 60%, a medium-performance filter that has a filtering efficiency of 90%, and a high-performance filter (a HEPA filter, a filtering efficiency of 99.99%) are used for the filter 20.

The frequency of the sound pressure is varied from 7 kHz to 13 kHz. After each filter is placed, an initial transmitted sound pressure at the beginning of the test and a final transmitted sound pressure when the loss of pressure reaches a specified value are measured. The attenuation of the transmitted sound pressure is calculated as the difference between the transmitted sound pressures.

Figure 9:
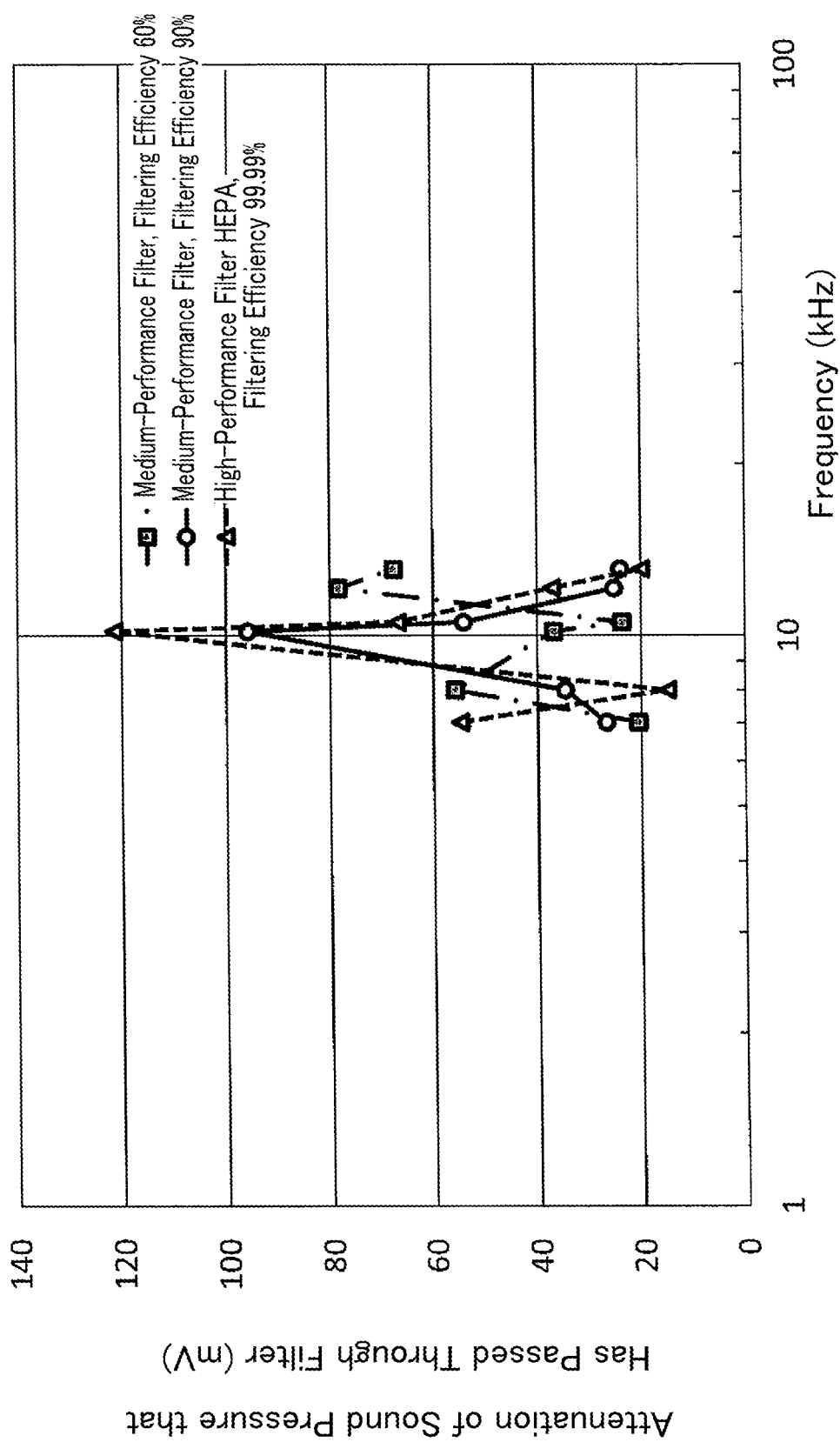
FIG. 9 is a graph showing a relationship between the attenuation of the sound pressure that has been transmitted through the filter and the frequency of the sound pressure when the kinds of filter are changed.

The measured results are shown in FIG. 9. As is clearly shown in FIG. 9, the attenuation of the transmitted sound pressure changes depending on the frequency of the sound pressure. The frequency for the peak of the attenuation changes depending on the kind of filter. The frequencies are 12 kHz for the medium-performance filter (the filtering efficiency of 60%), and 10 kHz for the medium-performance filter (the filtering efficiency of 90%) and the high-performance filter. It is assumed that the sound pressure that is reflected by the filter has a similar tendency. That is, when an oscillator and a speaker that can change the frequency of the sound pressure are used instead of the buzzer 28, the loss of the pressure can be measured with sensitivity.

Figure 10:
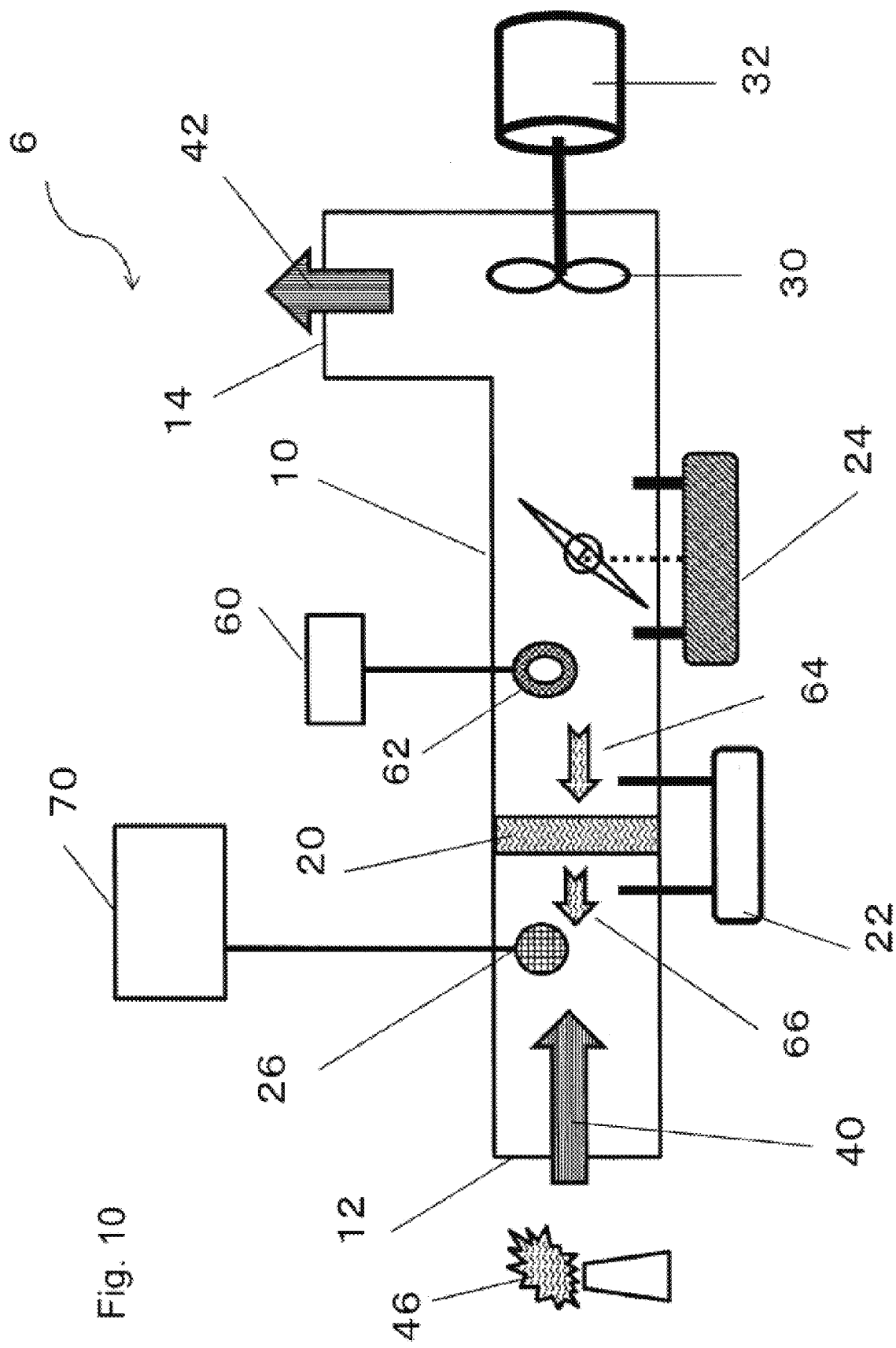
FIG. 10 is a schematic view of the horizontal-type device for testing a filter that measures the sound pressure generated by the oscillator and the speaker that has been transmitted through the filter.
Figure 11:
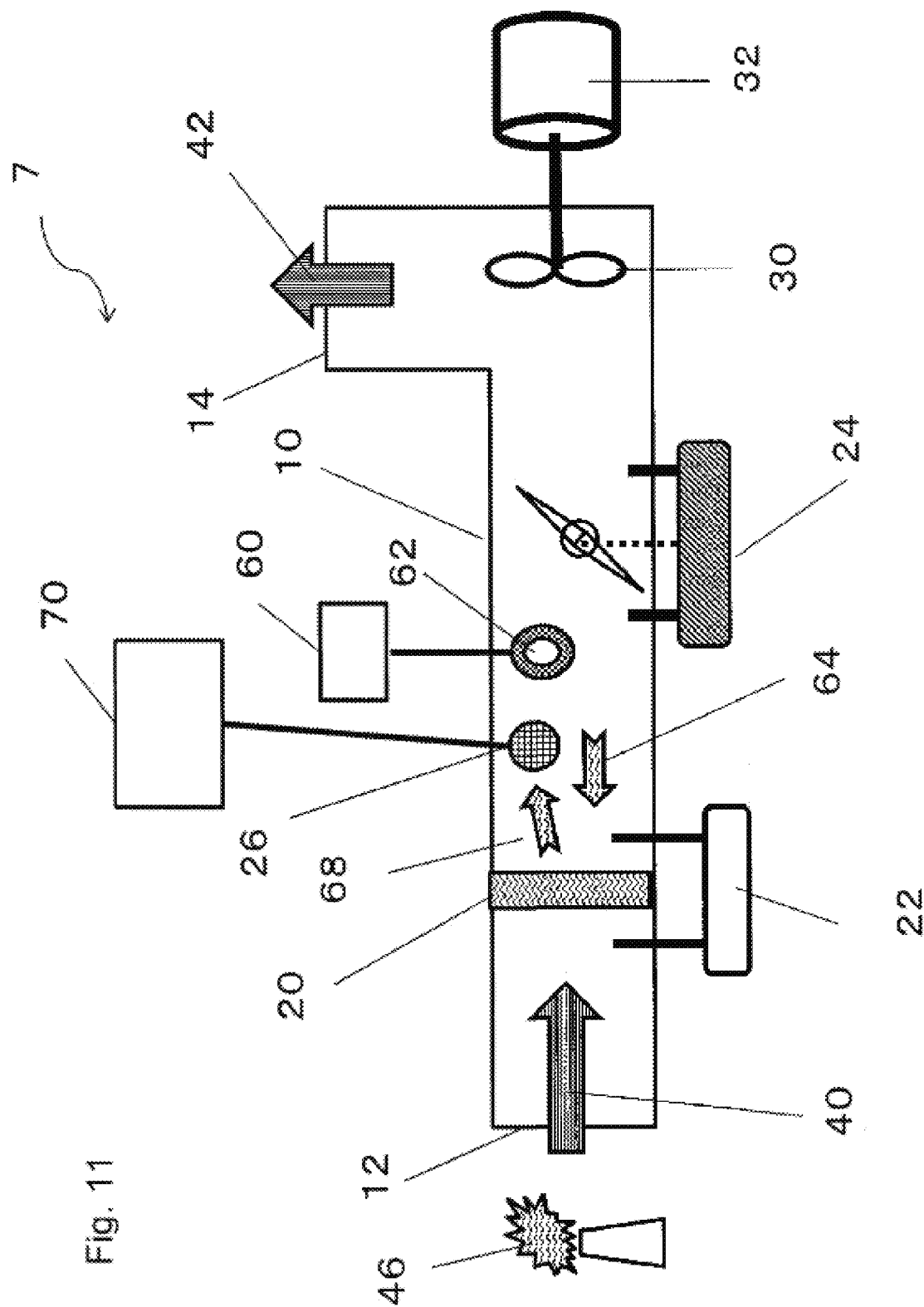
FIG. 11 is a schematic view of the horizontal-type device for testing a filter that measures the sound pressure generated by the oscillator and the speaker that has been reflected by the filter.

FIG. 10 illustrates the horizontal-type device 6 for testing a filter that has the oscillator 60 and the speaker 62. In it the speaker 62 is located upstream of the filter 20 and the microphone 26 for detecting the sound pressure is located downstream of the filter 20. The sound pressure 64 is generated by the speaker 62. The microphone 26 detects the sound pressure 66 that has passed through the filter 20. FIG. 11 illustrates the horizontal-type device 7 for testing a filter that has the oscillator 60 and the speaker 62. In it the speaker 62 and the microphone 26 for detecting the sound pressure are located downstream of the filter 20. The sound pressure 64 is generated by the speaker 62. The microphone 26 detects the sound pressure 68 that has been reflected by the filter 20. Incidentally, the oscillator 60 may be a part of the controller 70.

By the horizontal-type device 6 for testing a filter and the horizontal-type device 7 for testing a filter, the frequency of the sound pressure can be set, depending on the kind of filter 20, as one by which the attenuation of the transmitted sound pressure or the reflected sound pressure (hereafter, "attenuation of the transmitted sound pressure, etc.") becomes high. Thus, the attenuation of the transmitted sound pressure, etc., can be sensitively measured. Normally, the accuracy of extraction is low in filtering electric signals. Thus, using a Fourier transform and an inverse Fourier transform is better. However, the frequency of the sound pressure can be set as a high frequency, such as 10 kHz, while the frequencies of noise that are generated by the elements of the air conditioner, such as a blower 30, are mainly less than 2 to 3 kHz. Thus, a sound pressure at a specific frequency can be easily extracted by filtering the electric signals. This leads to a data processor with a simple structure.

In a place that has many air conditioners, such as a plant, possible clogging of the filter must be measured at many points. When data on the sound pressure at many points are subject to a Fourier transform and an inverse Fourier transform, a huge number of calculations are needed. Thus, a data processor, such as a central control unit of a plant, may not be able to calculate them. Though it is preferable to extract the data at every point for the measurements, a data processor that can carry out a Fourier transform and an inverse Fourier transform is expensive. In contrast, a data processor that uses filtering electric signals is less expensive and is simple. This is a great merit for it.

As discussed above, by constructing devices 2, 3, 4, 5, 6, and 7 for measuring the clogging of the filter 20 in the air conditioner by means of the microphone 26 for detecting the sound pressure and the controller 70, and the buzzer 28, or the oscillator 60 and the speaker 62, as required, clogging of a filter can be accurately measured by means of a simple structure. Further, the elements are only a microphone that is for sale on the market, and the buzzer 28 or the oscillator 60 and the speaker 62, as required, all of which are available for sale on the market, and the controller 70. Thus, the maintenance is facilitated.

Below, the main reference numerals and symbols that are used in the detailed description and drawings are listed.

1, 2, 3, 4, 5, 6, 7 the horizontal-type devices for testing a filter (the air conditioner)
10 the duct
12 the intake port
14 the exhaust port
20 the filter
22 the instrument for measuring the pressure at the filter
24 the flow controller (an instrument for measuring the flow)
26 the microphone for detecting the sound pressure
28 the buzzer
30 the blower
32 the driver for the blower
40 the gas (before passing through the filter)
42 the gas (after passing through the filter)
46 the dust-generator
50 the sound pressure
52 the sound pressure (reflected)
54 the sound pressure (transmitted)
56 the sound pressure generated by the buzzer
58 the sound pressure (generated by the buzzer; reflected)
59 the sound pressure (generated by the buzzer; transmitted)
60 the oscillator
62 the speaker
64 the sound pressure generated by the speaker
66 the sound pressure (generated by the speaker; transmitted)
68 the sound pressure (generated by the speaker; reflected)
70 the controller (the data processor, or the estimating device)

The invention claimed is:

1. A device for measuring clogging of a filter in an air conditioner that comprises a blower that blows gas through a duct and a filter that is provided in the duct and filters dust floating in the gas comprising:
   a device for measuring a sound pressure that is provided in the duct;
   a data processor that extracts data on the sound pressure at a specific frequency from the data on the sound pressure that have been measured by means of the device for measuring a sound pressure; and
   an estimating device that estimates clogging of the filter based on the data on the sound pressure at the specific frequency that have been extracted by means of the data processor,
   wherein:
      the specific frequency is the natural frequency of the blower; or
      a buzzer that generates a sound pressure at the natural frequency is provided in the duct and the specific frequency is the natural frequency of the buzzer; or
      an oscillator and a speaker that generate a sound at a frequency that is determined based on the filter are provided in the duct, wherein the specific frequency is a frequency of the sound that is generated by the oscillator and the speaker.

2. The device for measuring clogging of the filter in the air conditioner of claim 1, wherein the device for measuring a sound pressure is located nearer the blower than the filter is in the duct.

3. The device for measuring clogging of the filter in the air conditioner of claim 2, wherein the estimating device estimates clogging of the filter by using the data on the sound pressure at the specific frequency that change with clogging of the filter.

4. An air conditioner comprising:
   the device for measuring clogging of the filter in the air conditioner of claim 2;
   the duct;
   the blower; and
   the filter.

5. The device for measuring clogging of the filter in the air conditioner of claim 1, wherein the device for measuring a sound pressure is located at a side of the filter and the other side of the filter faces the blower in the duct.

6. The device for measuring clogging of the filter in the air conditioner of claim 5, wherein the estimating device estimates clogging of the filter by using the data on the sound pressure at the specific frequency that change with clogging of the filter.

7. An air conditioner comprising:
   the device for measuring clogging of the filter in the air conditioner of claim 5;
   the duct;
   the blower; and
   the filter.

8. The device for measuring clogging of the filter in the air conditioner of claim 1, wherein the estimating device estimates clogging of the filter by using the data on the sound pressure at the specific frequency that change with clogging of the filter.

9. An air conditioner comprising:
   the device for measuring clogging of the filter in the air conditioner of claim 1;
   the duct;
   the blower; and
   the filter.

* * * * *